Figure 1:
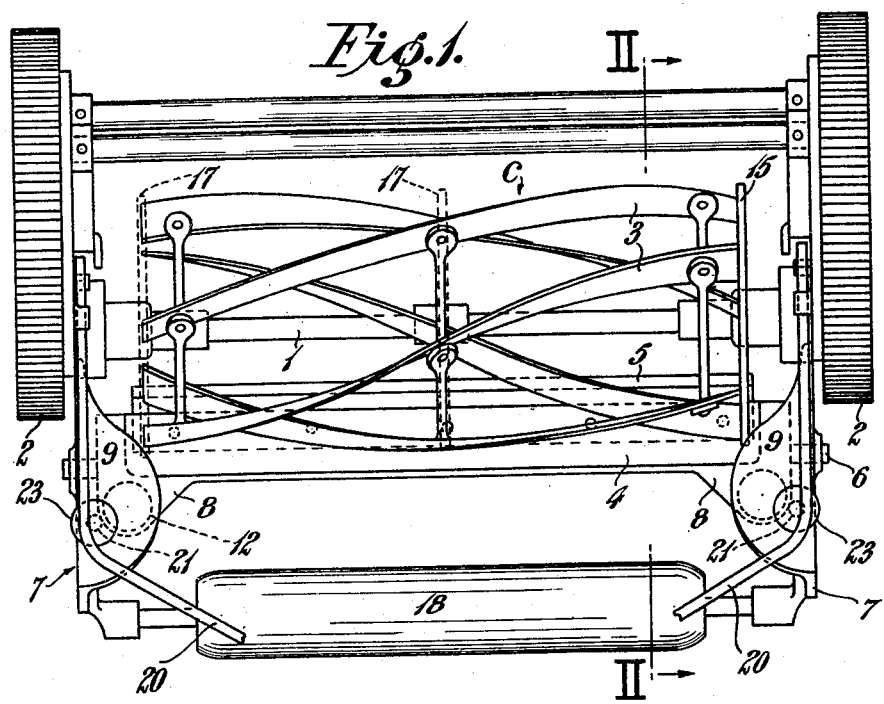

April 18, 1933. T. J. EDWARDS 1,904,280

LAWN MOWER

Filed March 6, 1930

Inventor:
Thomas Jutson Edwards
Attorney

Patented Apr. 18, 1933

1,904,280

UNITED STATES PATENT OFFICE

THOMAS JUTSON EDWARDS, OF HAWTHORN, VICTORIA, AUSTRALIA

LAWN MOWER

Application filed March 6, 1930, Serial No. 433,771, and in Australia July 17, 1929.

This invention refers to lawn mowers of the type having a rotary cutter operating in conjunction with a stationary knife to effect the cutting of the grass.

One of the objects of the invention is to provide improved automatic means for self-adjustment between the blades of the rotary cutter and the knife which ensures sharp edges being maintained on the cutting elements and dispenses with the usual double set of adjusting set screws or bolts.

Heretofore with rotary cutters mounted on pivoted arms, springs were employed with the object of keeping the blades of the rotary cutter in frictional contact with the edge of a rigid knife, but this construction is defective in that the jolting of the ground or traction wheels causes the rotary cutter to move to and from the rigid knife and thus defeat the object of the springs.

According to another form of lawn mower the knife is pivoted and its edge is pressed towards the blades of the rotary cutter by means of springs, it being necessary however to employ set screws to adjust the edge of the knife relative to the edges of the rotary cutter and such adjustment must be frequently effected to maintain the mower in workable condition.

A lawn mower is also known wherein the knife was pivoted on a knife bar and springs were employed to press the edge of the knife towards the rotary cutter, but such construction was not practicable as no means were provided for maintaining the knife in position or preventing it fouling the blades of the rotary cutter.

According to this invention the knife is pivoted to tilt in a vertical plane with springs to maintain the edge of said knife in permanent contact with the blades of the rotary cutter and in addition one or more circular elements are provided on the rotary cutter which have the same diameter and axis as the rotary cutter, so that the edge of said knife is in permanent contact with the periphery of said rotary element as well as the edges of the blades of the cutter.

By this means, even if only a single circular element is employed at one end of the rotary cutter, it is not possible for the knife to foul the blades of the cutter, but on the other hand such construction ensures the edge of the knife being resiliently held in constant contact with the blades of the cutter, and as the metal of the knife and cutter blades will wear evenly no adjustment is necessary and the friction ensures sharpening of the cutting edges of the mower.

It will be understood by this construction that jolting of the traction wheels will not cause the knife edge to move away from the cutter blades as is the case with mowers having the rotary cutter mounted on pivoted arms as above explained.

A further feature of the invention resides in encasing the springs to prevent chippings or earth choking same and rendering them inoperative, while another feature consists in the employment of spring supports for the handle of the implement, the objects of which are to minimize back kicking of the implement when its cutting mechanism becomes momentarily choked and to generally provide a more comfortable balance to the implement.

The invention is illustrated by the accompanying drawing whereof—

Fig. 1 is a plan of the lawn mower and—

Figure 2:
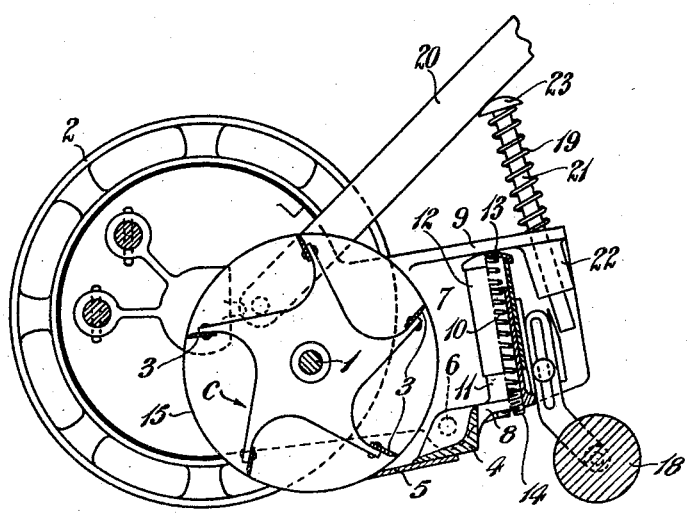

Fig. 2 a vertical section on line II—II of Fig. 1.

The rotary cutter C is mounted on a spindle 1 rotated by a pinion and crown wheel through the medium of the ground wheels 2 in the usual manner, said rotary cutter being fitted with a series of spiral blades 3.

The knife bar 4 to which the knife 5 is fixed is pivoted as at 6 at its ends to the side cheeks 7 of the frame of the implement in the usual manner.

The knife bar is provided at the rear at each end with a rearwardly projecting lug 8 and superposed corresponding lugs 9 are provided on the cheeks 7.

The springs 10 at each side of the implement are located between the lugs so that bearing against the rear of the knife bar 4 they press the knife 5 against the spiral blades 3 of the rotary cutter C.

In order to prevent the springs becoming clogged each is housed in a two-piece telescopic casing, the inner lower member 11 of which is fixed to the lug 8 and the upper outer member 12 bears at its end against lug 9.

The end 13 of member 12 is rounded or domed to permit free movement against the underside of lug 9 which is preferably coated with grease or said lug may be suitably curved on its underside.

Each spring 10 is inserted through coincident openings in the lug 8 and bottom of member 11 of the telescopic casing and is retained by a screw plug 14 fitting said openings which plug is also employed to adjust the tension of the spring.

The rotary cutter C is provided with one or more circular elements such as disks or rings 15 which are equal in diameter to said cutter i. e. the length of the radius of said disk or ring equals the distance between the spindle of the cutter and the edges of its blades. Thus the edge of the knife by reason of the springs always contacts with the disk as well as the edge of the cutter blades and consequently it is impossible for the knife edge to foul the blades. As metal of similar hardness is used in the disk and blades the periphery of the disk and edges of the blades will wear uniformly.

One disk on the right hand side of the cutter is sufficient as a blade first contacts with the knife at such side and at the same time the opposite end of the preceding blade is bearing on the opposite end of the knife so that the springs exert an even pressure at each end of the knife and the latter is therefore not capable of end tilting movement which if it occurred would cause one end of a blade to foul the knife.

If desired another similar disk may be employed at the left hand side of the cutter and another in the centre as illustrated by broken lines 17.

The back portion of the cutter including the roller 18 is pressed downwardly by means of springs 19 so that objectional back kicking of the implement when an object temporarily jambs between the blades and knife is prevented or at least considerably minimized.

A spring 19 is employed at each side of the implement, and is located between the lug 9 on the cheek 7 and the fork members 20 of the handle. As illustrated the spring is wrapped on a pin 21 which engages a socket 22 formed on the cheek and said pin is provided with a head 23 located beneath one of the fork members of the handle.

The weight of the handle bearing on the pins puts the springs in sufficient tension to resist the rising tendency of the cheeks 7 and the roller and the springs afford a support for the handle and generally improves the balance of the implement.

I claim:—

1. A lawn mower comprising a frame, a rotary cutter mounted on said frame, a knife pivotally mounted on said frame adapted to cooperate with said rotary cutter to produce a cutting action, a bearing surface on said frame, a telescopic casing having one portion rigidly fixed to and movable with said pivoted knife, a second portion telescopially engaging the first portion, and a spring in the casing for urging the second portion of the telescopic casing into contact with the bearing surface and for urging the pivoted knife into contact with the rotary cutter.

2. A lawn mower comprising a frame, a rotary cutter mounted on said frame, a knife pivotally mounted on said frame adapted to cooperate with said rotary cutter to produce a cutting action, a bearing surface on said frame, an element reciprocally mounted on the cutter and provided with a convex surface adapted to engage with the bearing surface on the frame, and a compression spring extending between the element and knife for urging the convex surface of the element against the bearing surface on the frame and for urging the knife into contact with the rotary cutter.

3. A lawn mower comprising a frame, a rotary cutter mounted on the frame, a knife bar pivoted on the frame, lugs on said bar and on said frame, a knife carried by said knife bar, a tubular casing rigidly fixed to the lug on said knife bar and adapted to move therewith, a coil spring in said casing, a cap having a rounded end telescoped on the casing and bearing against the lug on the frame, said spring serving to urge the lug on the knife bar away from the lug on the frame and to urge the knife into engagement with the rotary cutter.

4. A lawn mower comprising a frame, a rotary cutter mounted on the frame, a knife bar pivoted on the frame, lugs on said bar and on said frame, a knife carried by said knife bar, a tubular casing rigidly fixed to the lug on said knife bar and adapted to move therewith, a coil spring in said casing, a cap having a rounded end telescoped on the casing and bearing against the lug on the frame, said spring serving to urge the lug on the knife bar away from the lug on the frame and to urge the knife into engagement with the rotary cutter, the lug on the knife bar having a threaded aperture therein and a screw threaded into the aperture, said screw having its inner end engaging one end of the coil spring for adjusting the position of said end of the spring relative to the lug of the knife bar and for varying the pressure of the knife on the rotary cutter.

THOMAS JUTSON EDWARDS.